Sept. 23, 1941.　　　　G. F. WATTS　　　　2,256,660
MACHINE FOR DISPENSING MOLDING MATERIAL TO MOLDS
Filed June 21, 1940　　　2 Sheets-Sheet 1
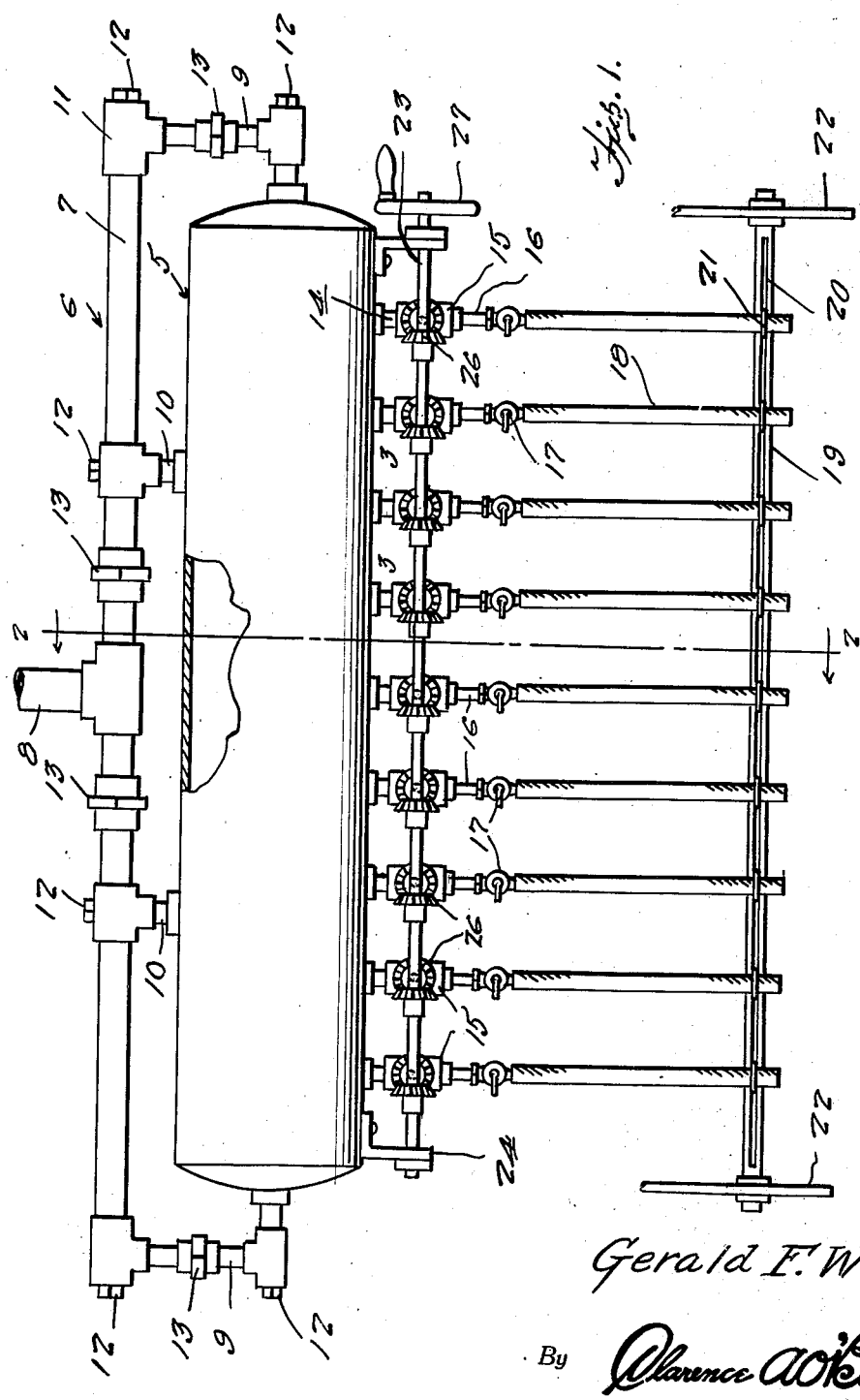
Inventor
Gerald F. Watts
By Clarence A. O'Brien
Attorney

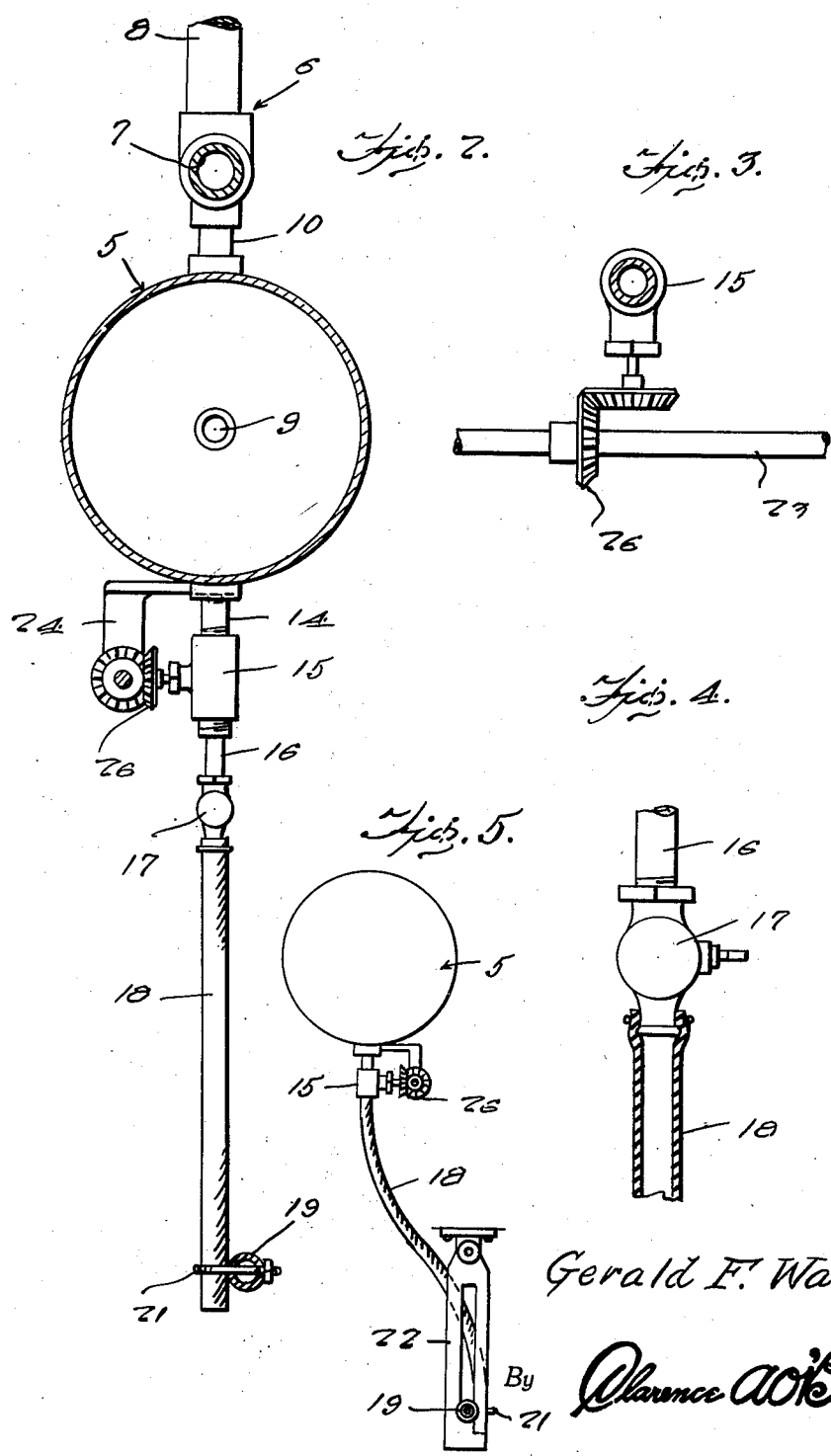

Patented Sept. 23, 1941

2,256,660

UNITED STATES PATENT OFFICE 2,256,660

MACHINE FOR DISPENSING MOLDING MATERIAL TO MOLDS

Gerald F. Watts, Crooksville, Ohio

Application June 21, 1940, Serial No. 341,758

1 Claim. (Cl. 226—93)

This invention relates to a machine especially adapted for supplying material to molds in the molding or forming of pottery and the like, and has for the primary object the provision of a device of this character which will assure a uniform and equal flow or distribution of material to a plurality of molds and which is so constructed that the flow of material to the various molds may be stopped and started at the will of the operator and further the flow of material to each mold may be regulated so that uniform supply of material to all molds may be had or whereby the supply of material to one or more of the molds may be discontinued while the other mold receives the material.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a side elevation, partly in section, illustrating a machine constructed in accordance with my invention.

Figure 2 is a transverse sectional view taken on the line 2—2 of Figure 1.

Figure 3 is a detail sectional view taken on the line 3—3 of Figure 1.

Figure 4 is a detail view, partly in section, showing one of the regulating valves and its connection to a flexible hose.

Figure 5 is an end elevation illustrating the device.

Referring in detail to the drawings, the numeral 5 indicates a horizontally arranged header in the form of a tank which is fed with molding material from a supply (not shown). The molding material is fed into the tank 5 at each end thereof and also at the top of said tank by a feeder arrangement 6 consisting of a pipe 7 paralleling the tank 5 in a plane thereabove and which has connected thereto a main supply pipe 8. The pipe 7 is connected to the ends of the tank 5 by pipes 9 and also is connected to the top wall of the tank by pipes 10. The pipes are coupled together by fittings 11 each having a cleanout plug 12 so that the various pipes and fittings can be readily cleaned out if stoppage of the material therein should occur. Further, it will be seen that the sections of the pipes 7 and 9 are detachably connected by unions 13 which will permit the feeding mechanism to the tank to be readily assembled and disassembled when desired.

It is to be understood that the tank 5 is supported in any well known manner and in proper elevation above molds to be filled with the material and the bottom wall of the tank has a plurality of nipples 14 connected thereto and to which valves 15 are connected. Nipples 16 connect the valves 15 to valves 17 and connected to the latter-named valves are flexible pipes or hose 18.

A supporting bar 19 is provided with a slot 20 to receive clamps 21 employed for adjustably mounting the hose or flexible tubes on the supporting bar adjacent the free ends thereof. The supporting bar 19 is adjustably mounted in hangers 22 whereby the supporting bar 19 may be raised and lowered. By having the hose or flexible tubes adjustably connected by the supporting bar 21 they may be readily positioned to supply materials into molds positioned thereunder and the supporting bar 19 being mounted for vertical adjustment will permit the free ends of the hose or flexible pipes to be directed upwardly whenever it is desired to prevent dripping of materials into the molds.

An operating shaft 23 is journaled in brackets 24 mounted on the tank 5 and are geared to the valves 15, as shown at 26, whereby the valves 15 may be simultaneously opened and closed by the rotation of the shaft 23 in opposite directions. To facilitate the rotation of the shaft 23, a hand wheel 27 is secured on one end of the shaft. The valves 17 are independently and manually operated so that the flow of material from the tank through the hose 18 may be regulated, that is, when the valves 15 are in open position, or if desired, any one of the hose may be cut off from the tank by the closing of the valve 17 of that hose.

In operation, it is to be understood that the material is fed into the tank 5 from the supply (not shown) and due to the arrangement of the feeder pipes an even distribution of this material to the tank 6 will be assured. After the molds have been positioned with respect to the ends of the hose or flexible pipes the operator opens the valves 15 so that the material may flow from the tank 5 into the molds and through the manipulation of the valves 17 the operator can regulate the amount of material received in each mold so as to assure a uniform supply of material to all molds, or if desired, any one of the hose or flexible tubes may be cut off from the tank 5 should it be desired, for any reason, that the mold associated therewith is not to receive material while the other molds receive the material from their respective hose.

The supporting bars 22 may be mounted for swinging movement so that the discharge ends of the hose may be directed upwardly to prevent material from dripping therefrom when changing molds. It is to be understood that the material may be cut off to all hose by operating the hand wheel 27, however, this will not prevent the material already in the hose from dripping therefrom. Therefore provision is made for lifting the free ends of the hose when changing molds.

While I have shown and described the preferred embodiment of my invention, it will be understood that minor changes in construction, combination and arrangement of parts may be made without departing from the spirit and scope of the invention as claimed.

Having thus described the invention, what I claim is:

In a machine of the class described, a header tank to contain a supply of material, a plurality of valves connected to the bottom wall of the tank, means for operating said valves simultaneously, hand operated valves connected to the first-named valves, flexible tubes connected to the hand operated valves, a slotted bar, clamps adjustably connected to the slotted bar and engaging the flexible tubes adjacent the free ends thereof whereby said tubes may be adjusted relative to each other on the bar, and pivotally mounted supporting members having the bar slidably connected thereto whereby the tubes may be simultaneously raised and lowered.

GERALD F. WATTS.